United States Patent [19]

Jaronko et al.

[11] E Re. 29,502

[45] Reissued Dec. 27, 1977

[54] FURNACE APPARATUS

[75] Inventors: John C. Jaronko; John T. Jaronko, both of New Britain, Conn.

[73] Assignee: Nutmeg Sanitation, Inc., New Britain, Conn.

[21] Appl. No.: 649,451

[22] Filed: Jan. 15, 1976

Related U.S. Patent Documents

Reissue of:

[64] Patent No.: 3,906,874
Issued: Sept. 23, 1975
Appl. No.: 393,021
Filed: Aug. 30, 1973

[51] Int. Cl.[2] ..... F23B 1/32; F23G 5/06

[52] U.S. Cl. ..... 110/14; 110/19; 110/119

[58] Field of Search ..... 110/14, 19, 119

[56] References Cited

U.S. PATENT DOCUMENTS

| | | | |
|---|---|---|---|
| 2,127,328 | 8/1938 | Egan | 110/14 |
| 3,098,458 | 7/1963 | Lantz, Jr. | 110/14 |
| 3,376,833 | 4/1968 | Mutchler | 110/14 |
| 3,572,264 | 3/1971 | Mercer | 110/119 |
| 3,584,609 | 6/1971 | Lerner et al. | 110/14 |
| 3,682,115 | 8/1972 | Rodgers | 110/19 |
| 3,728,976 | 4/1973 | Domnitch | 110/19 |

*Primary Examiner*—Kenneth W. Sprague
*Attorney, Agent, or Firm*—Robert S. Smith

[57] ABSTRACT

Apparatus for collecting and disposing of refuse having a wheeled chassis carrying a hopper, shredder and fan for directing air and refuse to a cylindrical member preferably obliquely disposed with respect to the chassis. A hollow tube is disposed within the cylindrical member in generally co-axial relationship. The tube is provided with a plurality of apertures for directing flame therefrom against refuse within the interior of the cylindrical member. Washing apparatus is included to minimize contamination dispersal into the atmosphere.

8 Claims, 4 Drawing Figures

FURNACE APPARATUS

Matter enclosed in heavy brackets [ ] appears in the original patent but forms no part of this reissue specification; matter printed in italics indicates the additions made by reissue.

*This is a Reissue Application of U.S. Pat. No. 3,906,874 issued Sept. 23, 1975, by John C. Jaronko and John T. Jaronko for Furnace Apparatus.*

BACKGROUND OF THE INVENTION

With the increasing recognition of ecological problems throughout the world, there has been particular emphasis placed on the rapidly expanding requirements for trash disposal as well as the minimization of effluents entering the atmosphere. Consideration has been given to various mobile vehicles which will burn refuse contemporaneously with a number of collections thereof and which have the advantages of reducing the volume of the refuse being collected and thereby the number of trips required to move the refuse to a disposal locaton. Such structures also have the long run advantage of reducing the capital expenditure for refuse equipment since a vehicle of this general type is capable of handling much larger volumes of refuse than traditional collecton and compaction devices.

One such device is shown in Brandt et al. U.S. Pat. No. 2,985,120 issued May 23, 1961. The apparatus shown therein has not been widely accepted, however, because it did not provide for complete burning of refuse and did not adequately deal with the ash and smoke generated by such a process.

Accordingly, it is an object of the invention to provide a novel mobile furnace vehicle which will completely burn combustible refuse. It is a further object of the invention to provide apparatus which will produce a minimum of contamination of the air while reducing the volume of the refuse to as great an extent as possible.

SUMMARY OF THE INVENTION

It has now been found that the objects of the invention may be met by a mobile apparatus for collecting and burning refuse which comprises a chassis having wheels for movement between collection and disposal points which carries a hopper for receiving the refuse. A shredder communicates with the hopper for reducing the size of the refuse received by the hopper. Transfer means moves the shredded refuse into a cylindrical member having perforate skin allowing passage of ash therethrough and having first and second ends. The first end communicates with the transfer means. A fan urges air through the cylindrical member and a hollow tube is disposed generally co-axially with respect to the cylindrical member which has a plurality of apertures disposed substantially uniformly about the circumference. The apertures are sized for burning fuel supplied to the interior of the hollow tube from a separate fuel supply and control means.

Liquid supply and spray means are provided for wetting the ash after it has passed through the cylindrical member. The passage may be either through the apertures in the skin of the cylindrical member of axially all the way through to the opposite end thereof in response to separate means for urging at least some of the refuse through to the second end of the cylindrical member.

Second transfer means are provided for moving the ash passing from the cylindrical member which urges that ash into a receiving means. A substantially closed housing is mounted on the chassis and encloses the cylindrical member, liquid spray means, second transfer means and a portion of the hollow tube.

A second fan is provided in fluid communication with the substantially closed housing to urge smoke from the interior thereof and into a purifying tank for washing the smoke.

In its preferred aspect the invention contemplates that the cylindrical member will be disposed in oblique relationship to the chassis with the first end higher than the second end. The fuel will be a liquefied gas which may be propane.

In another aspect of the invention, the apparatus is generally similar to that referred to above but a mesh conveyor belt is substituted for the cylindrical member and one or more hollow tubes are positioned above the mesh belt to provide the desired burning action.

DETAILED DESCRIPTION OF THE PREFERRED EMBODIMENT

Figure 1:
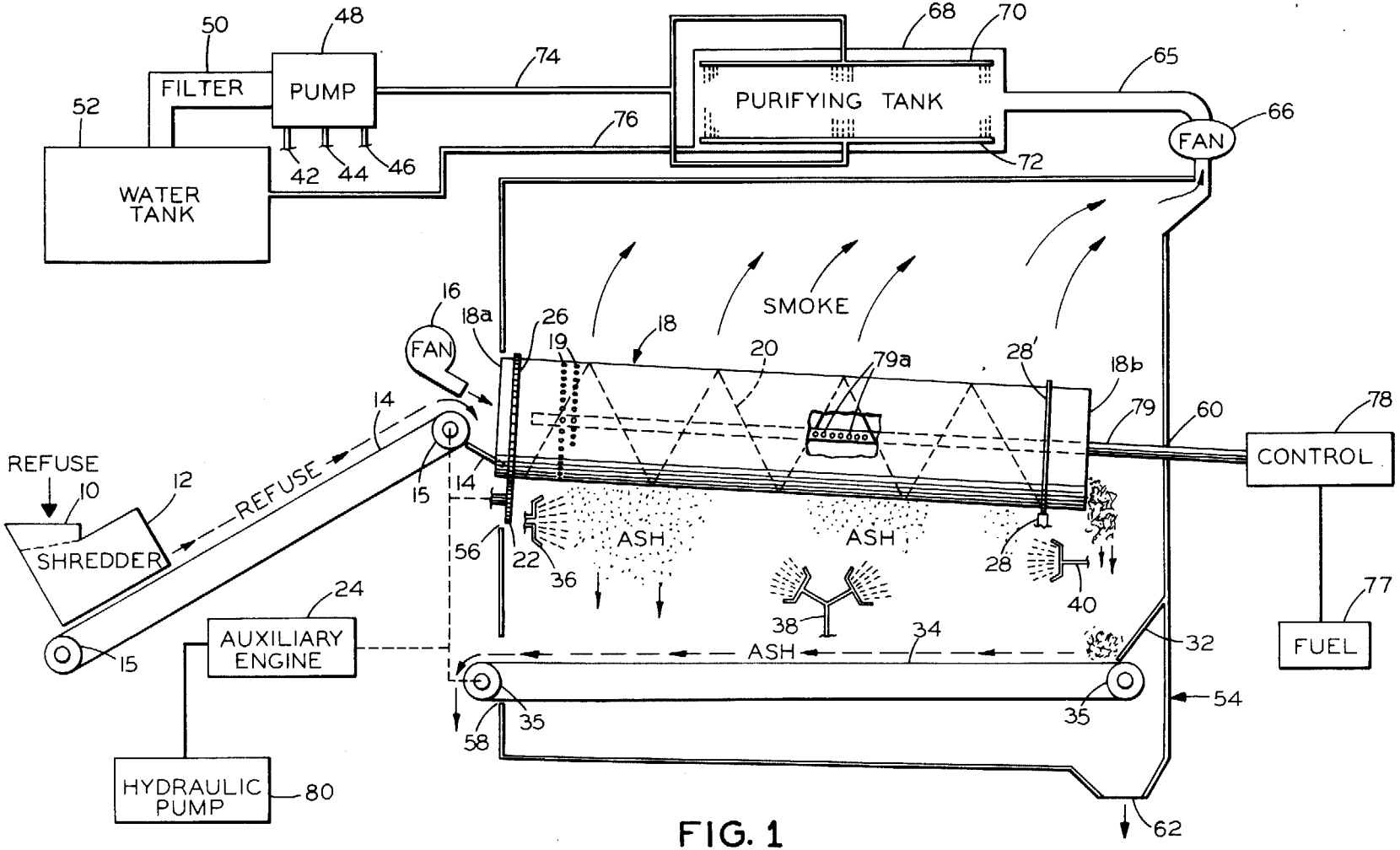
FIG. 1 is a partially schematic elevational view of the apparatus of the invention.

Turning now in detail to the attached drawing, therein illustrated is a mobile furnace vehicle embodying the present invention and having a hopper generally designated by the numeral 10. The hopper 10 is located at the rear of the machine and is of conventional construction. Positioned next to the hopper is a shredder 12 so disposed so that refuse directed into the hopper 10 will continue into the shredder 12. The shredder will in a conventional manner reduce the particle size of the refuse reaching it and prepare the material for combustion process. Thereafter the shredded refuse is directed by means of a transfer means or belt 14 having rollers 15. A fan 16 directs a positive flow of air along with the shredded refuse which is urged by gravity along a chute 17 to the center of a cylindrical member 18. The cylindrical member has a first or upper end 18a and a lower or second end 18b and in the preferred embodiment has a length of approximately eleven feet with various capacity machines. Obviously, the dimensions noted may change substantially without departing from the invention. The surface of the cylindrical member 18 is provided with a plurality of holes 19 extending between the interior and exterior surfaces and most preferably the holes 19 are disposed at closely spaced intervals and may be approximately five-eighths of an inch in diameter. A generally planar helical element 20 extends about the interior surface of the cylindrical member 18 in generally upstanding relationship to that interior surface. This helical element 20 provides a means for controlling the speed with which refuse is transferred through the cylindrical member 18 so that a flame may be directed against it to provide uniform and complete burning. As oxidization occurs small particles of ash may be shifted through the holes 19.

Figure 3:
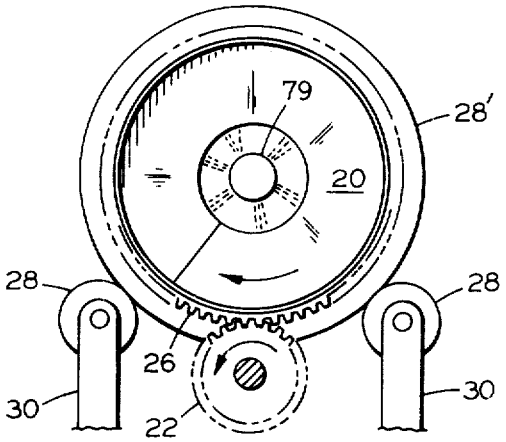
FIG. 3 is a detailed view to an enlarged scale of the driving means having a cylindrical member shown in FIG. 1.

Referring also to FIG. 3 there is shown in greater detail apparatus for driving the cylindrical member 18 about the axis thereof which includes a first spur gear 22 which engages in driving relationship a second spur gear 26 disposed about the circumference of the cylindrical member 18 in fixed relationship thereto. An auxiliary engine 24 is connected in driving engagement to the spur gear 22 for movement of the cylindrical member 18. Radial support for the cylindrical member 18 is provided by rollers 28,28 which are fixed on supports 30,30 which are in turn held by suitable structure which has been omitted for simplicity. Rollers 28,28 engage support 28' fixed to the circumference of cylindrical member 18. It will be [undestood] *understood* that a chain or belt drive may also be used without departing from the invention.

As best shown in FIG. 1 refuse that is not sifted through holes 19 is ejected from the lower end 18b of the cylindrical member and is directed by a second chute 32 to a second conveyor belt 34. The second conveyor belt 34 is carried on rollers 35,35 which are driven by mechanical connection from the auxiliary engine 24. The ash which is directed on the second conveyor belt 34 through the holes 19 and the end 18b of the cylindrical member 18 is sprayed from water spray outlets 36, 38 and 40 which are respectively connected by conduits 32, 34 and 36 to a pump 48. Water entering the pump 48 is passed on the suction side thereof through a filter 50 as it passes out a water tank 52. An enclosure 54 is provided to limit the flow of gaseous products of combustion and to prevent accidental discharge of refuse. The enclosure has various ports therein including port 56 for loading of refuse, 58 for discharge of solid combustion products, 60 for passage of a hollow tube to be described hereafter and port 64 joins ducting 65. The ducting 65 has a fan 66 disposed within it for urging the gaseous combustible products into a purifying tank 68.

In the purifying tank the gaseous combustible products are washed preparatory to discharging. Spray manifolds 70,72 are provided therein to produce a mist of heavier spray within the purifying tank 68 to thoroughly cleanse the gaseous products. The water supplied to spray manifolds 70,72 is routed through conduit 74 from pump 48. A drain line 76 is connected to the lower extremity of purifying tank 68 for return of water that has been used to the water tank. [It] *In* some embodiments of the invention, the gaseous products after washing will be exhausted to the atmosphere. In other embodiments the gaseous products will be condensed by the spray and little if any gaseous discharge to the atmosphere will occur.

A fuel reservoir 77 is provided in fluid communication with a control which ordinarily will include a valve for modulating the flow of gaseous fuel to a hollow tube 79. The hollow tube 79 will have holes 79a disposed at closely spaced intervals about the circumference thereof which extends within the cylindrical member 18 in a generally co-axial relationship. In the preferred embodiment the fuel utilized will be propane although many of various liquefied fuels which become gaseous at ambient pressure will be suitable. Such fuels are particularly desirable since they require the least space for storage. A hydraulic pump 80 will drive the shredder 12. The drive for the conveyor belt 14 may be either mechanical from the auxiliary engine 24, hydraulic from the hydraulic pump 80 or electrical from a generator (not shown) driven by the auxiliary engine 24. Those skilled in the art will recognize that the precise manner of driving the apparatus is not a critical part of the invention.

Figure 2:
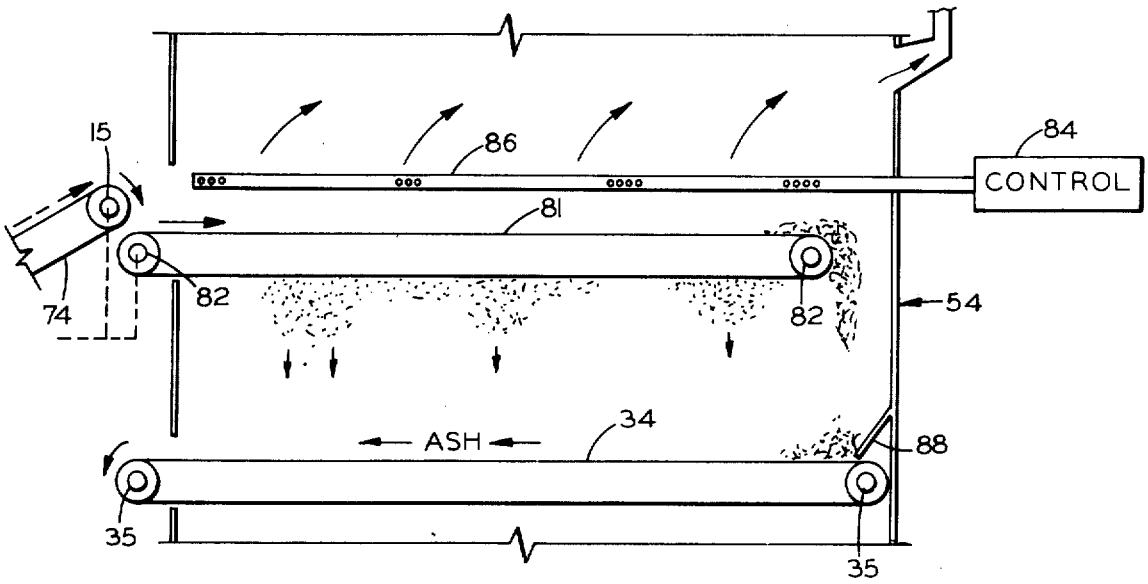
FIG. 2 is a detailed partially schematic elevational view of an alternate embodiment.

Referring now to FIG. 2 an alternate embodiment is illustrated wherein a mesh conveyor belt 81 of flexible steel elements is provided to carry trash beneath one or more hollow tubes 86 disposed in closely spaced relationship. The conveyor belt 81 is carried by rollers 82,82 and a control 78 identical to that provided in the embodiment shown in FIG. 1 is provided with a first conveyor belt 34 supported on rollers 35 within a chamber 54 having outlet ports 64. Part of the ash residue left after the burning of the trash will filter through the first conveyor belt 34 to a second conveyor belt 81. A chute 88 directs the flow of any ash which does not filter through the conveyor belt 81 from the end of the first conveyor belt 34 on to the second conveyor belt 34. In all respects not illustrated the embodiment of FIG. 2 is identical with that shown in FIG. 1.

Figure 4:
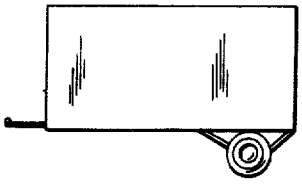
FIG. 4 is a simplified side elevational view to a greatly reduced scale of a mobile vehicle in accordance with the invention showing a simplified chassis provided with wheels.

FIG. 4 illustrates in very simplified form a chassis havng thereon an enclosure 54 and wheels 96 (not shown) to better illustrate mobility of the apparatus in the preferred embodiment.

In operation the apparatus of the invention may be fed by a plurality of other vehicles such as relatively small motor scooters with buckets for moving trash or in other large embodiments may be fed by much larger trash trucks of a more conventional nature. In each case the trash from a given region, which may constitute a street, neighborhood or section of a city depending on the size of the apparatus involved, may be burned as the material is fed into the hopper 10. In some communities it may be desirable to utilize the apparatus of the invention at a fixed site without any attempt to move from one location to another. It may be desirable to continue the use of conventional refuse trucks to feed that installation. It will be understood that the hopper 10 and shredder 12 are sized to limit the rate of delivery of trash to the cylindrical member 18 to prevent feeding at a rate which would prevent complete combustion during the available cycle time. The combustion process within the cylindrical member 18 will deposit ash on the conveyor belt 34 where the spray from water spray outlets 36,38,40 will cool the ash as well as avoiding any tendency for the ash to rise into the suction fan 66. Suitable means (not shown) are provided for igniting the fuel discharged from hollow tube 79 and these may be either a pilot light or electrical discharge means in accordance with apparatus well known in the art. The waste storage area which has been omitted for simplicity will be located beneath the structure shown in FIG. 1. Drain valves (not shown) are provided for flushing of the purifying tank and water tank. Similarly, means are provided for back-flushing any residue which may accumulate in filter 50. Various instrumentations will be provided for showing the quantity and pressure of water in water tank 52 and the pressures at the outlets of water pump 48 and hydraulic pump 80. In some cases it may be desirable to install pressure drop instrumentation across filter 50 to avoid clogging thereof. A blow-off cover (not shown) may be provided on the upper surface of the enclosure 54 which will open in the event of explosive combustion of the fuel within the enclosure 54. This cover will avoid the dangers inherent in having such very rapid burning within a fixed structure.

Thus it can be seen from the foregoing detailed specification and drawing that the present invention provides a highly effective mobile furnace vehicle which will completely burn the refuse which is supplied to it and which will produce a minimum of effluent to the air. The apparatus may be simply and economically constructed and permit wide-spread adoption of the invention.

What I claim as new and desire to secure by Letters Patent of the United States is:

1. [A mobile] *An* apparatus for collecting and burning refuse comprising:

a chassis [having wheels for movement between collection and and disposal points and] having thereon the following structures:

a hopper disposed on said chassis for receivng refuse;

a shredder communicating with said hopper for reducing the size of the refuse received by said hopper to particles suitable for burning;

a first transfer means for receiving refuse conditioned by said shredder;

[a cylindrical member] *an elongated hollow chamber* having a perforate skin for allowing passage of ash therethrough and having first and second ends, said first end communicating with said first transfer means for receiving said refuse;

means for urging at least some of said refuse through said [cylindrical member] *chamber* to said second end;

a fan communicating with said [cylindrical member] *chamber* for supplying air to the interior of said [cylindrical member;] *chamber;* a hollow tube disposed generally co-axially with respect to said [cylindrical member] *chamber* and having a plurality of apertures disposed substantially uniformally about the circumference [of said apertures], said apertures being sized for burning a fuel;

a fuel supply and control means for supplying fuel to said hollow tube;

a liquid supply and a liquid spray means for wetting ash passing out of said [cylindrical member] *chamber* through said perforate skin and said second end of said [cylindrical membr;] *chamber;* second transfer means for moving ash from said [cylindrical member;] *chamber;* an ash receiving means disposed in communication with said second transfer means;

a substantially closed housing mounted on said chassis and enclosing said [cylindrical member] *chamber*, liquid [spary] *spray* means, second transfer means and at least a portion of said hollow tube;

a second fan in fluid communication with said substantially closed housing urging smoke from the area of said substantially closed housing; and a purifying tank for washing the smoke conducted by said second fan and in fluid communication with said fan.

2. [An] *The* apparatus as described in claim 1 wherein said [cylindrical member] *chamber* is disposed with the axis thereof in oblique relationship to said chassis with said first end higher than said second end.

3. The apparatus as disclosed in claim 2 wherein said [cylndrical member] *chamber* is rotatably mounted and includes drive means for rotating said [cylindrical member] *chamber* about the axis thereof to urge refuse therethrough and said [cylindrical member] *chamber* includes a helical generally planar member upstanding from the interior side of the surface thereof to urge the refuse axially along said [cylindrical member] *chamber* when said [cylindrical member] *chamber* is rotated by said drive means.

4. The apparatus as described in claim 3 wherein said fuel is gaseous and said control means includes valving regulating the flow thereof to said hollow tube.

5. The apparatus as described in claim 4 wherein said first and second transfer means comprises belts carried on rollers.

6. The apparatus as described in claim 5 further including a hydraulic pump and an auxiliary engine for driving said rollers carrying said transfer means and said hydraulic pump.

7. [A mobile] *An* apparatus for collecting and burning refuse comprising:

a chassis having thereon the following structures:

a hopper disposed on said chassis for receiving refuse;

a shredder communicating with said hopper for reducing the size of the refuse received by said hopper to particles suitable for burning;

a first transfer means for receiving refuse conditioned by said shredder;

[a cylindrical member] *an elongated hollow chamber* having a perforate skin for allowing passage of ash therethrough and having first and second ends, said first end communicating with said first transfer means for receiving said refuse;

means for urging at least some of said refuse through said [cylindrical member] *chamber* to said second end;

a fan communicating with said cylindrical member for supplying air to the interior of said [cylindrical member;] *chamber;* a hollow tube disposed generally co-axially with respect to said [cylindrical member] *chamber* and having a plurality of apertures disposed substantially uniformly about the circumference of said apertures, said apertures being sized for burning a fuel;

a fuel supply and control means for supplying fuel to said hollow tube;

a liquid supply and a liquid spray means for wetting ash passing out of said [cylindrical member] *chamber* through said perforate skin and said second end of said [cylindrical member;] *chamber;* second transfer means for moving ash from said [cylindrical member;] *chamber;* an ash receiving means disposed in communication with said second transfer means;

a substantially closed housing mounted on said chassis and enclosing said [cylindrical member,] *chamber,* liquid spray means, second transfer means and at least a portion of said hollow a second fan in fluid communication with said substantially closed housing urging smoke from the area of said substantially closed housing; and substantially closed housing; and a purifying tank for washing the smoke conducted [bby] *by* said second fan and in fluid communication with said fan.

*8. The apparatus as claimed in claim 1 wherein said chamber is cylindrical.*

* * * * *